United States Patent [19]
Syeda-Mahmood

[11] Patent Number: 6,108,444
[45] Date of Patent: Aug. 22, 2000

[54] METHOD OF GROUPING HANDWRITTEN WORD SEGMENTS IN HANDWRITTEN DOCUMENT IMAGES

[75] Inventor: Tanveer F. Syeda-Mahmood, Rochester, N.Y.

[73] Assignee: Xerox Corporation, Stamford, Conn.

[21] Appl. No.: 08/939,894

[22] Filed: Sep. 29, 1997

[51] Int. Cl.[7] .............................. G06K 9/18; G06K 9/36; G06K 9/00; G06K 9/34
[52] U.S. Cl. .......................... 382/186; 382/288; 382/170; 382/177
[58] Field of Search .................................... 382/203, 229, 382/201, 202, 187, 200, 177–179, 186–190, 288

[56] References Cited

U.S. PATENT DOCUMENTS

| | | | |
|---|---|---|---|
| 4,847,912 | 7/1989 | Tanaka et al. | 382/9 |
| 5,216,725 | 6/1993 | McCubbrey | 382/177 |
| 5,640,466 | 6/1997 | Huttenlocher et al. | 382/177 |
| 5,692,073 | 11/1997 | Cass | 382/219 |
| 5,774,586 | 6/1998 | LeCun | 382/215 |
| 5,812,696 | 9/1998 | Arai et al. | 382/185 |
| 5,850,477 | 12/1998 | Takada | 382/186 |
| 5,854,853 | 12/1998 | Wang | 382/176 |
| 5,854,855 | 12/1998 | Errico et al. | 382/187 |

FOREIGN PATENT DOCUMENTS

WO 95/30965  11/1995  WIPO .

OTHER PUBLICATIONS

Nalwa, Vishjit S. Automatic On–Line Signature Verification. Proceedings of the IEEE, vol. 85, No. 2, pp. 215–239, Feb. 1997.

Article by Y. Lamdan and H.J. Wolfson entitled "Geometric Hashing: A general and efficient model–based recognition scheme", in Proceeding of the International Conference on Computer Vision, pp. 218–249, 1988.

Article by Y. Lamdan and H.J. Wolfson entitled "Transformation invariant indexing" in Geometric Invariants in Computer Vision, MIT Press, pp. 334–352, 1992.

Article by F.C.D. Tsai entitled "Geometric hashing with line features" in Pattern Recognition, vol. 27, No. 3, pp. 377–389, 1994.

An Article by W.E.L. Grimson and D. Huttenlocher entitled "On the sensitivity of geometric hashing", in Proceedings International Conference on Computer Vision, pp. 334–339, 1990.

Article by G. Bebis, M. Georgiopolous and N. Lobo entitled "learning geometric hashing functions for model–based object recognition" in Proceedings International Conference on Computer Vision, pp. 543–548, 1995.

Article by I. Rigoustos and R. Hummel, "massively parallel model matching: Geometric hashing on the connection machine" in IEEE Computer, pp. 33–41, Feb. 1992.

Article by R. Manmatha, C. Han and E. Riseman, entitled "Word spotting: A new approach to indexing handwriting" in Proceedings IEEE Computer Vision and Pattern Recognition Conference, pp. 631–637, 1996.

Giovanni Seni and Edward Cohen, "Segmenting Handwritten Text Lines into Words Using Distance Algorithms,", SPIE vol. 1661 (1992) pp. 61–72.

Copy of European Search Report.

*Primary Examiner*—Jose L. Couso
*Assistant Examiner*—Shawn B Cage
*Attorney, Agent, or Firm*—L. M. Ortiz; G. B. Cohen; P. E. Blair

[57] ABSTRACT

A method and system of recognizing handwritten words in scanned documents, wherein by processing a document containing handwriting, features for word localization are extracted from handwritten words contained in said document through basis points taken from a single curve of text lines. The method is independent of page orientation, and does not assume that the individual lines of handwritten text are parallel, and the method does not require that word regions be aligned with text line orientation wherein intra-word statistics are derived from sample pages rather than using a fixed threshold. The method has applications in digital libraries, handwriting tokenization, document management and OCR systems.

14 Claims, 12 Drawing Sheets

*While it is true that these problems exist also for image databases designed for a stand alone use, they are felt more keenly when Search databases are designed*

METHOD OF GROUPING HANDWRITTEN WORD SEGMENTS IN HANDWRITTEN DOCUMENT IMAGES

FIELD OF THE INVENTION

This invention is related to handwriting recognition and indexing and, more particularly, to a method for grouping text segments into handwritten words for purposes of indexing such documents based on word queries.

BACKGROUND OF THE INVENTION

The ability to detect and recognize handwritten words in handwritten documents is important for several applications. While the strategic importance of such a capability in current commercial handwriting recognition products is clear, its use in applications such as digital libraries and document management cannot be ignored. With digital libraries, for example, there is a major concern over the preservation and electronic conversion of historical paper documents. Often, these documents are handwritten and in calligraphic styles, as in a sample of a church record used in genealogy studies illustrated in FIG. 1. An important aspect of the use of electronic versions of such documents is their access based on word queries. Handwritten keyword extraction and indexing can also be a valuable capability for document management, in handling a variety of irregular paper documents such as handwritten notes, marks on engineering drawings, memos and legacy documents.

Figure 2A:
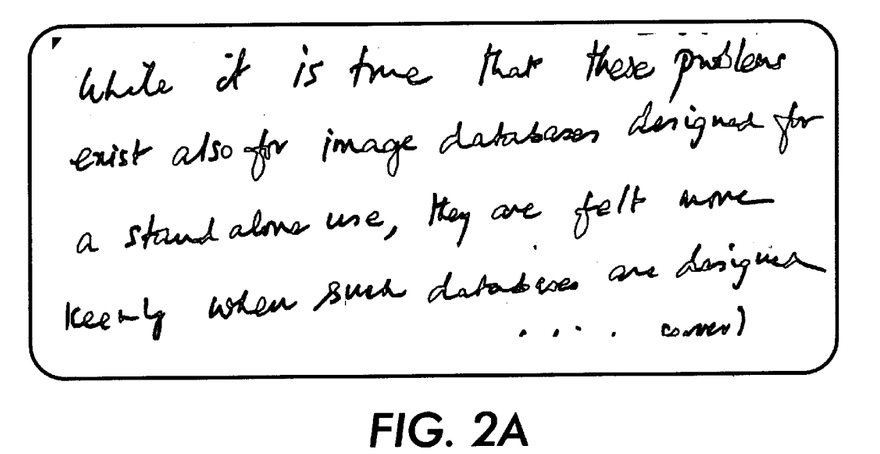
FIG. 2A illustrates a second sample handwritten document image.
Figure 2B:
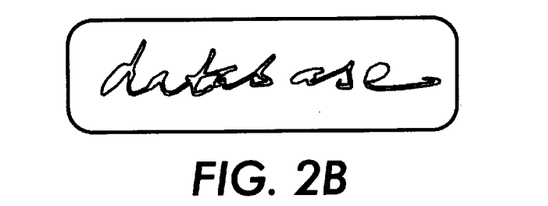
FIG. 2B illustrates a handwritten query word "database" within the sample handwritten document of FIG. 2A.
Figure 2C:
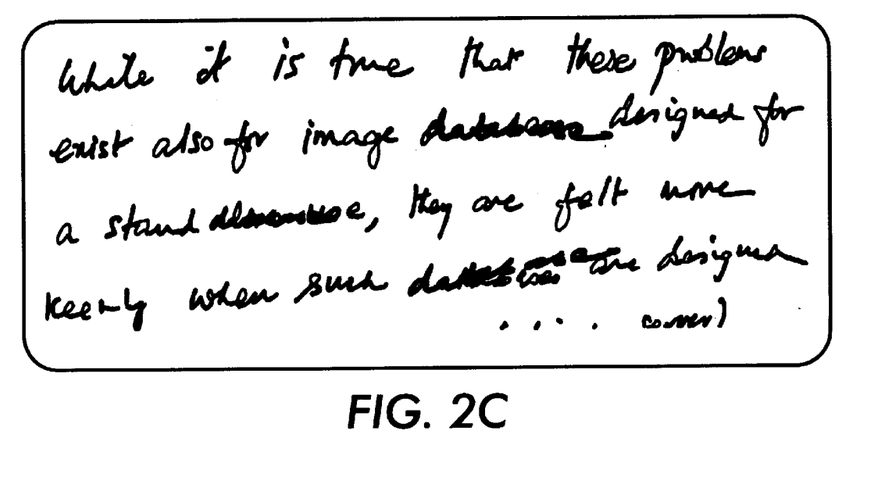
FIG. 2C illustrate the subject query word "database" projected at candidate locations within the scanned handwritten document image of FIG. 2A.

While an OCR algorithm can be used to extract text keywords for index creation of scanned printed text documents, such a process is not yet an option for handwritten documents due to a lack of robust handwriting recognition algorithms. One of the difficulties is due to the fact that the same word could be written differently at different locations in a document even when the document is written by a single author. In cursive script, this often means that a word is written as a collection of word segments separated by intra-word separations that are characteristic of the author. FIGS. 2A–C illustrate this situation, where the word "database" is written by the same author differently in the various instances it occurs. Further, the different word instances could exhibit different amounts of global skew, because lines of handwritten text are often not parallel as in printed text. This latter fact makes the detection of lines of handwritten text a further difficulty during recognition.

Figure 1:
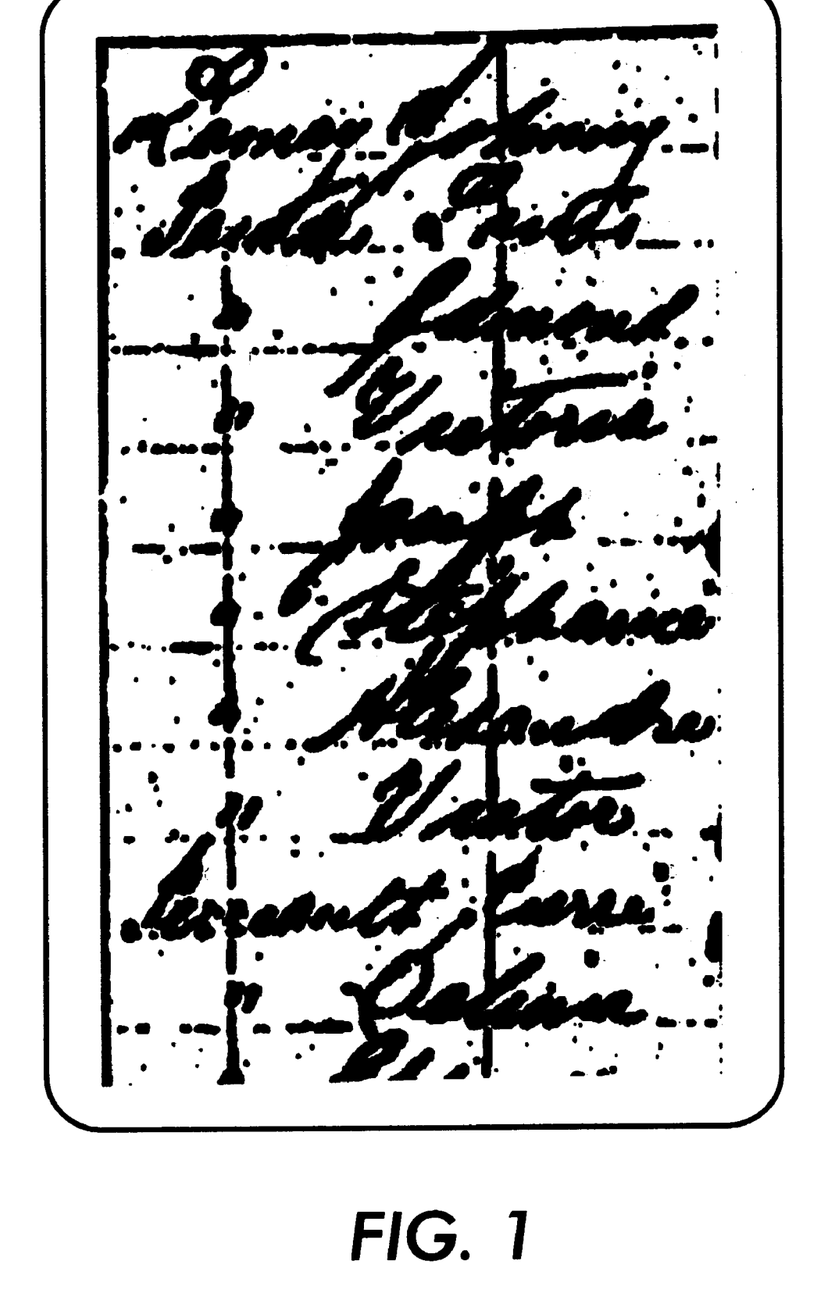
FIG. 1 illustrates a scanned image of a sample handwritten document.

The present method of grouping handwritten words was motivated by an application that required image indexing of old calligraphic handwritten church record documents for purposes of tracing genealogy. These documents were written against a tabular background, as shown in FIG. 1. On being given a query about a person's name, the task was to locate the relevant records. While the formulation of query word patterns for these documents is an interesting problem, for the purposes of this disclosure relevant problem is that of matching handwritten words after they have been formulated by a user—perhaps by a training process that generates such pattern queries from actual typed text queries, or perhaps such queries are derived from the handwritten document itself.

A method of localizing handwritten word patterns in documents exploiting a data structure, called the image hash table, to succinctly represent feature information needed to localize any word without a detailed search of the document, is presented in U.S. Pat. No. 5,953,451 issued to Syeda-Mahmood on Sep. 14, 1999. The use of an image hash table to localize objects draws upon ideas of geometric hashing that has been used in the past for identification of objects in pre-segmented image regions. These concepts are discussed in articles by Y. Lamdan and H. J. Wolfson entitled "Geometric hashing: A general and efficient model-based recognition scheme", Proceeding of the International Conference on Computer Vision, pages 218–249, 1988, and "Transformation invariant indexing", Geometric Invariants in Computer Vision, MIT Press, pages 334–352, 1992. More work has been done in extending the basic geometric hashing scheme for use with line features as described in an article by F. C. D. Tsai entitled "Geometric hashing with line features" Pattern Recognition, Vol. 27, No. 3, pages 377–389, 1994. An extensive analysis of the geometric hashing scheme has been done in an article by W. E. L. Grimson and D. Huttenlocher entitled "On the sensitivity of geometric hashing", Proceedings International Conference on Computer Vision, pages 334–339, 1990. Finding good geometric hash functions has also been explored in an article by G. Bebis, M. Georgiopolous and N. Lobo entitled "Learning geometric hashing functions for model-based object recognition" Proceedings International Conference on Computer Vision, pages 543–548, 1995, and an extension of geometric hashing using the concept of rehashing the hash table has been discussed in an article by I. Rigoustos and R. Hummel "Massively parallel model matching: Geometric hashing on the connection machine" IEEE Computer, pages 33–41, February 1992.

All the prior work has used the geometric hashing technique for purposes of model indexing in object recognition where the task is to determine which of the models in a library of models is present in the indicated region in the image. The localization of handwritten words in unsegmented handwritten documents is an instance of image indexing (rather than model indexing) for which no prior work on using geometric hashing is known. Work that uses a serial search of the images for localizing handwritten words as described in an article by R. Manmatha, C. Han and E. Riseman, entitled "Word spotting: A new approach to indexing handwriting", Proceedings IEEE Computer Vision and Pattern Recognition Conference, pages 631–637, 1996, only begins to address the need.

U.S. Pat. No. 5,640,466 issued to Huttenlocher et al. on Jun. 17, 1997, entitled "Method of Deriving Wordshapes for Subsequent Comparison", describes a method for reducing an image of a character or word string to one or more one dimensional signals, including steps of determining page orientation, isolating character strings from adjacent character strings, establishing a set of references with respect to which measurement about the character string may be made, and driving a plurality of measurements with respect to the references in terms of a single variable signal, from which information about the symbol string may be derived.

Localization or indexing of a specific word in the document is done by indexing the hash table with information derived from the word is such a manner that the prominent hits in the table directly indicate candidate locations of the word in the document, thus avoiding a detailed search. This method accounts for changes in appearance of the handwritten word in terms of orientation, skew, and intra-word separation that represent the way a single author may write the same word at different instances. More specifically, localizing any word in the image hash table is done by indexing the hash table with features computed from the word pattern. The top hits in the table are candidate locations most likely to contain the word. Such an indexing automatically gives pose information which is then used to project the word at the indicated location and then verify it. Verification then involves determining the extent of match between the underlying word and the projected word. The generation and indexing of image hash tables takes into account the changes in appearance of the word under 2D affine transforms, changes in the orientation of the lines of text, overall document skew, changes in word appearance due to occlusions, noise, or intra-word handwriting variations made by a single author.

Generally, localization and detection of handwritten words involves four stages: (1) Pre-processing where features for word localization are extracted; (2) Image hash table construction; (3) Indexing where query word features are used to look up hash table for candidate locations; and (4) Verification, where the query word is projected and registered with the underlying word at the candidate locations. The focus of the present disclosure is on stage (1) of this processing, namely, in the stage where features for word localization are generated. Therefore, a feature of the present invention is in the ability to recognize and generate handwritten word regions for purposes of feature generation used ultimately for handwritten word indexing.

Disclosures of all of the references cited and/or discussed above in this Background are incorporated herein by reference for their teaching.

SUMMARY OF THE INVENTION

The invention is a method of grouping text segments to generate handwritten words for the recognition and indexing of documents. An ability to accomplishing handwritten word indexing not only extends the capability of current document management systems by allowing handwritten documents to be treated in a uniform manner with printed text documents but can also be the basis for compressing such documents by handwritten word tokenization.

As discussed in the Background, localization and detection of handwritten words generally involves four stages: (1) Pre-processing where features for word localization are extracted; (2) Image hash table construction; (3) Indexing where query word features are used to look up hash table for candidate locations; and (4) Verification, where the query word is projected and registered with the underlying word at the candidate locations. The focus of the present disclosure is on stage (1), the pre-processing of handwritten words, namely, in the stage where features for word localization are generated. Specifically, this stage presents a method for grouping text segments into handwritten words by doing the following processing stages: (1) Connected region generation; (2) Region feature extraction; (3) Orientation histogram computation; (4) Selective Hough transform generation; (5) Handwritten text line detection; (6) Along-line inter-region distance computation; (7) Intra-word separation determination; (8) Curve and corner feature extraction from regions; and finally, (9) Intra-word text segment grouping.

As for a system, a microprocessor can be programmed to generate words in handwritten documents by processing a scanned document containing handwriting to extract and group features from handwritten words contained in the document.

Other advantages and salient features of the invention will become apparent from the following detailed description which, taken in conjunction with the drawings, discloses preferred embodiments of the invention.

DESCRIPTION OF THE DRAWINGS

The accompanying drawings, which are incorporated in and form part of the specification, illustrate an embodiment of the present invention and, together with the description, serve to better explain the operation features, and advantages of the invention. It should be understood, however, that the invention is not limited to the precise arrangements and instrumentalities shown.

DETAILED DESCRIPTION OF THE INVENTION

This invention discloses a method of grouping text segments forming part of single handwritten words in a document. This is done primarily to enable handwriting localization under changes in word appearance using an image hash table data structure, or similar devices known in the character recognition art, populated with features derived from text regions. The grouping of text segments into handwritten words requires the knowledge of intra-word separation between text segments that lie along a line of text. Unlike in printed text, deducing lines of text in handwritten document usually is difficult because handwritten text words are often not written on a straight line. Furthermore, consecutive lines of text may not be parallel as in printed text. Finally, an author may vary the inter-word and intra-word spacing while writing so that different instances of the same word may show writing differences. This makes the task of determining which text segments belong to a word difficult.

The method of the present invention disclosed herein is independent of page orientation, and does not assume that the individual lines of handwritten text are parallel. Furthermore, it does not require that all word regions be aligned with the text line orientation. Finally, it derives intra-word statistics from the sample page itself, rather than using a fixed threshold.

Figure 3:
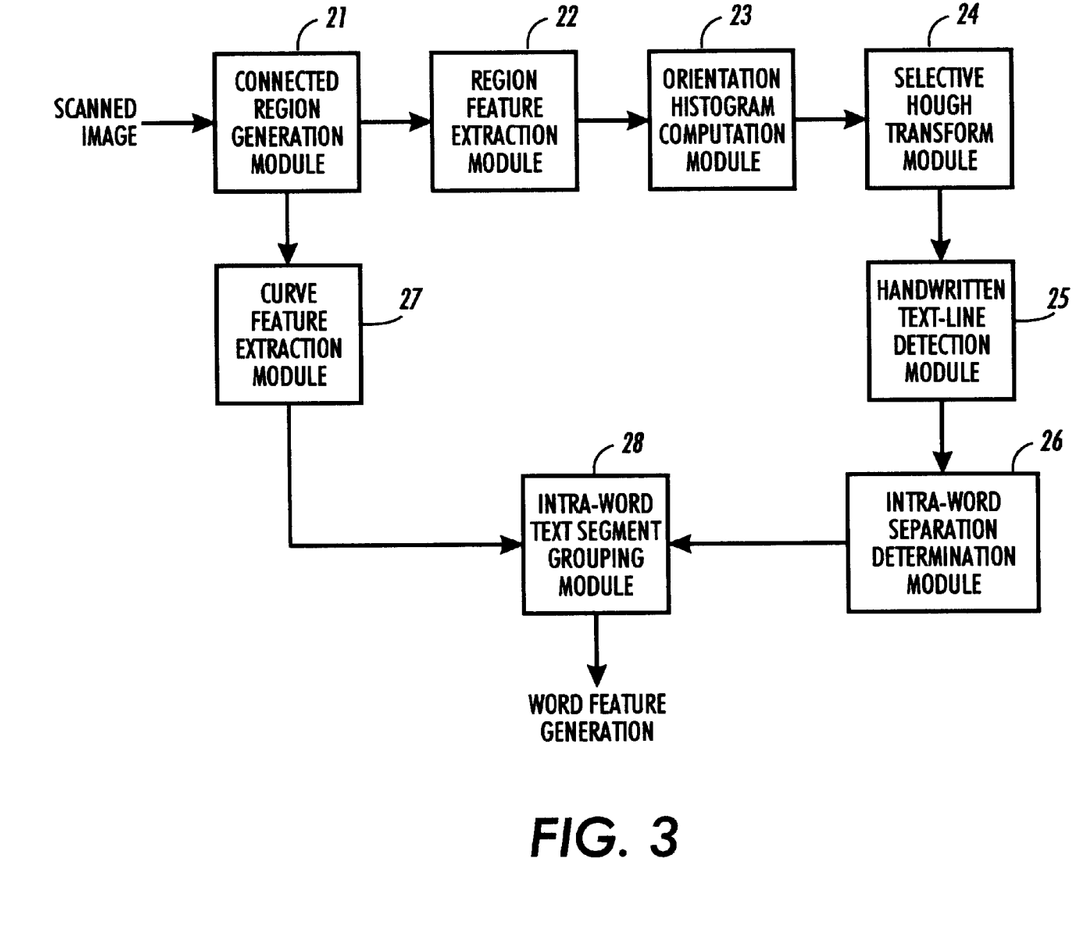
FIG. 3 illustrates a block diagram of the processing modules of the invention involved in hand written word recognition.

Referring to FIG. 3, the components for generating handwritten word regions in documents are illustrated. In the pre-processing step of the invention, original documents are obtained by scanning handwritten pages at high resolution (typically 200 dpi or higher) are used.

In the first step, connected regions of text in the scanned document are formed in the connected region module 21. Although several methods of finding connected components exist, the following algorithm is used to determine the connected components regions:

1. Record run lengths of "on" pixels (assuming white background) per image pixel row using low[i], high[i] arrays that maintain the start and end points of the run lengths.
2. Initially put all runlengths in separate groups denoted by C_{i} for runlength i.
3. For all end point pixels (k,l) in low[i] and high[i] arrays, do the following steps:
   Step A: Find the number of "on" neighboring pixels (k',l') and their associated run lengths, and
   Step B: Merge the given runlength with the neighboring runlength identified above. This is recorded by having all merged runlength having the same group identification.

The above algorithm can be efficiently implemented using a data structure called the union-find data structure as described in a book by Cormen, Leisersen and Rivest entitled "Introduction to algorithms", MIT Press, 1994, to run in time linear in the number of runlengths in the image.

In the next stage of processing, region features such as the centroid and dominant orientation are noted in the region feature extraction module 22. The centroid of the region is derived from the first order moments of the region, while the orientation of the region is determined by the direction of the moment of inertia axis of the region. The formula for finding the moment of inertia axis is given in Chapter 3 of the book entitled "Robot Vision" by B. K. P. Horn, MIT Press, 1986, and is re-produced here for convenience.

The orientation of the moment of inertia axis is given by the orientation of the line joining the origin '(0,0) with the point $$\left(\sqrt{\sqrt{(a-c)^2+b^2}-(c-a)}, \sqrt{\sqrt{(a-c)^2+b^2}-(a-c)}\right)$$

Where a, b, and c, are the second order moments given by:

$$a = \int\int x^2 b(x, y) dx dy,$$

$$b = 2\int\int xy b(x, y) dx dy,$$

$$c = \int\int y^2 b(x, y) dx dy, \text{ where } b(x, y) = 1$$

when the pixels are on the region and 0 otherwise, as determined from the connected component generation.

A histogram of orientations is generated in orientation histogram computation module 23. Peaks in the histogram are automatically selected to represent major word orientations in the image. For each of the dominant orientations selected a line of the specified orientation is drawn through the centroids of each of the regions. The selective Hough transform module 24 performs a selective Hough transform to determine groups of such lines. The Hough transform described in a book by D. Ballard and C. Brown entitled "Computer Vision", Prentice-Hall, Chapter 4, pages 123–124, 1982, was used to record this information. The resulting data structure, called the Hough Transform Table, is a two-dimensional array that records the number of points (centroids of region here) that lie along or lie close to a line of specified orientation and position. The highest valued entries in this table are taken to correspond to candidate lines of text in the handwritten text line detection module 25. The regions whose centroids contribute to the peak table entries are noted. These word segment regions thus are taken to form the lines of text in the handwritten document image.

Once the lines of text, and hence the word segments that lie along a lines of text, are determined, the intra-word separation is estimated in the Intra-word separation determination module 26. For each line of text determined above, the boundaries of the word segment regions lying on the line are used to determine two extremal points per region; that is, all the boundary points of a region are projected onto the line, and the beginning and end points noted. A projection of a given point onto a line is the point of intersection of a perpendicular line through the given point with the given line. All such projections are now sorted in an increasing order along the line, using a conventional sorting algorithm. Distances between the end point of a region and the beginning point of another are noted to represent separations between word segments. These distances are recorded for all lines of text. A histogram of such distances is generated. For most handwritten documents such a histogram shows at least two distinct peaks. The peak at the lowest separation distance is noted as intra-word separation.

Using the estimated intra-word separation, the text segmented belonging to the words are generated by extracting curves from the text regions. The curve feature extraction module 27 proceeds by determining the boundary points on the connected component regions as those points that have at least one "off" neighbor. A cyclic trace of such boundary pixels is used to yield curves representing the boundaries of the connected component regions. The curves are smoothed using a conventional line-segment approximation algorithm. Other methods of curve tracing can be used without significantly affecting the claims in this invention.

The pre-processing step of curve extraction can be applied uniformly to a document image or to a query word represented as an image pattern, and takes time linear in the size of the image.

Using the intra-word separation, and the curves belonging to text regions, the intra-word text segment grouping module 28 assembles curve groups by grouping word segment regions that are separated along the line of text orientation by a distance within a certain bound of the intra-word separation determined above. The grouping of curves separated by intra-word separation (±a chosen threshold) is done using the union-find data structure mentioned earlier.

EXAMPLE

Figure 4:
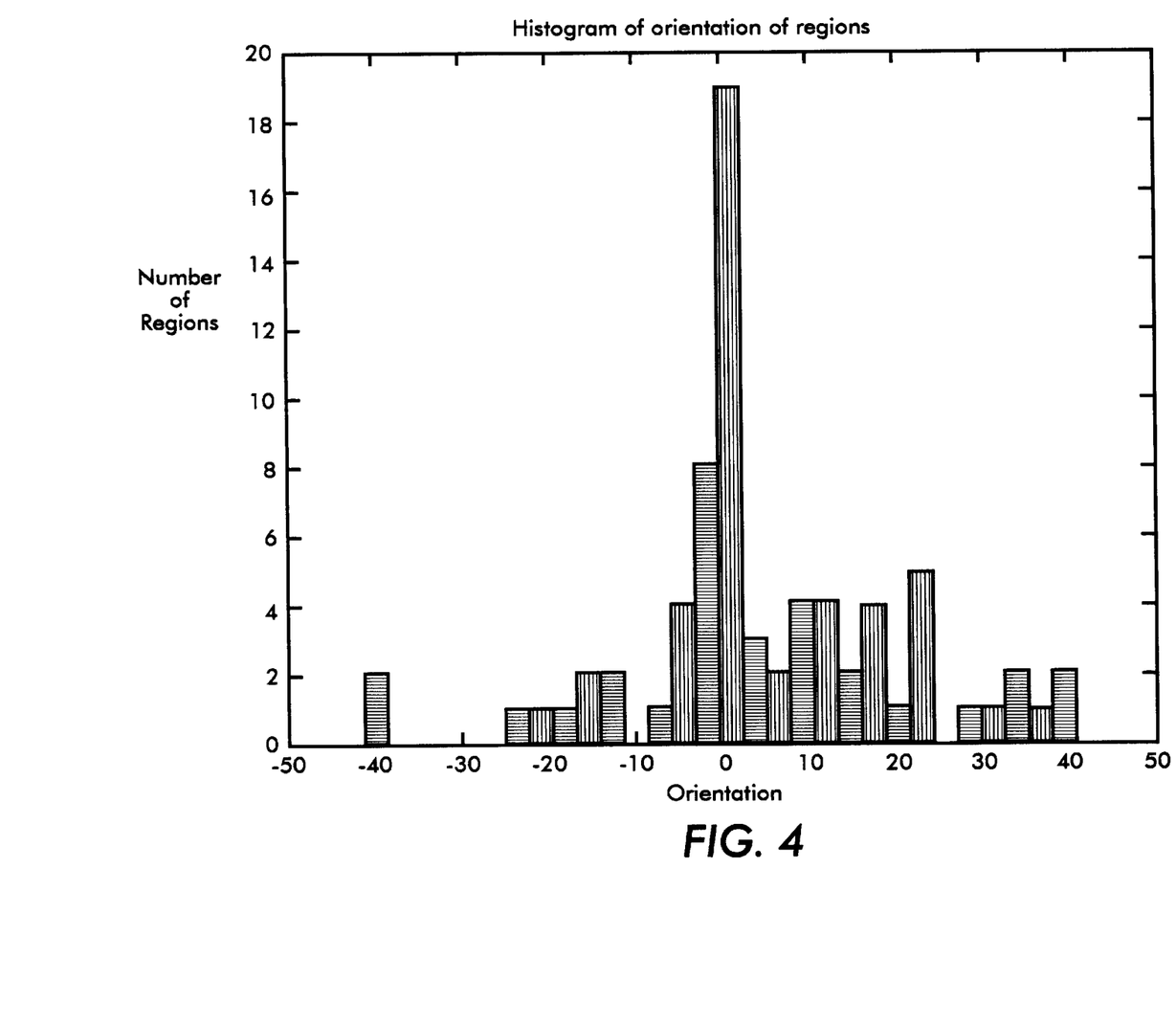
FIG. 4 illustrates an orientation histogram of text regions in the image of FIG. 2A.
Figure 5:
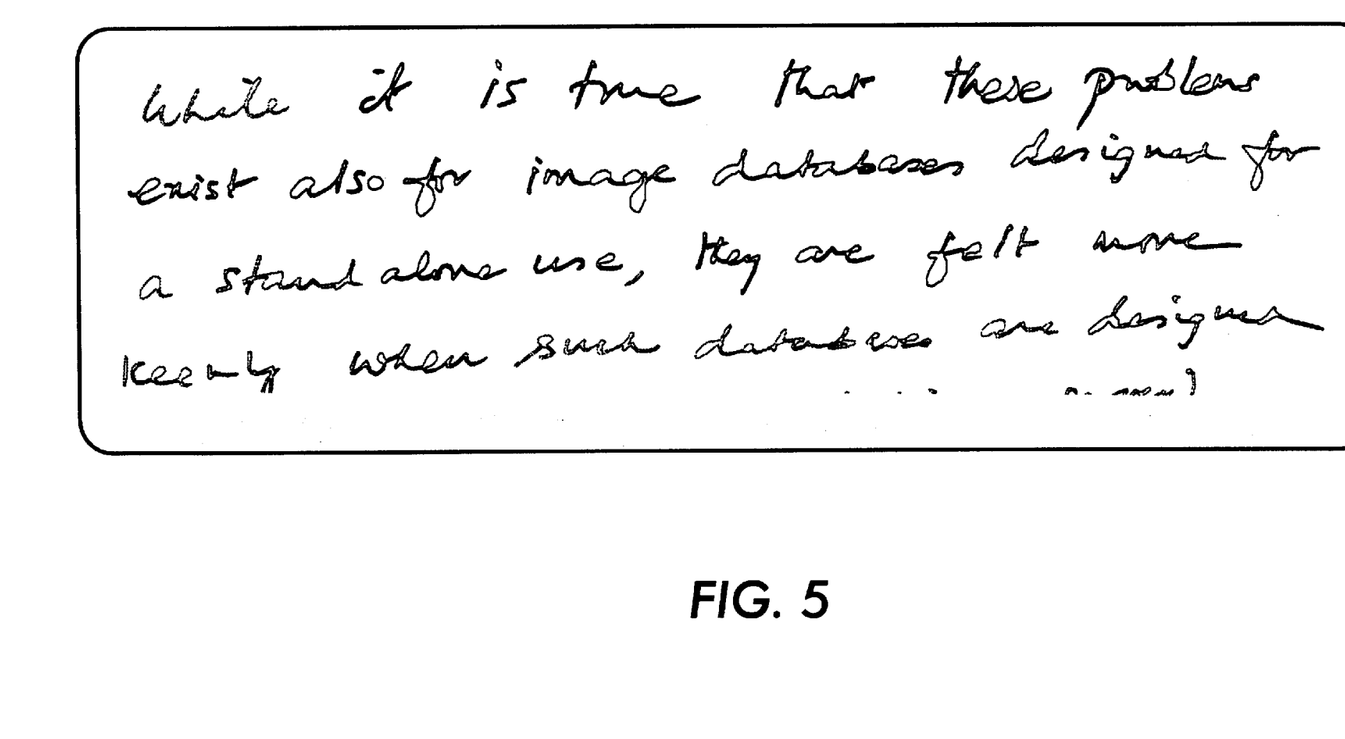
FIG. 5 illustrates curves in the handwritten sample document of FIG. 2A.
Figure 6:
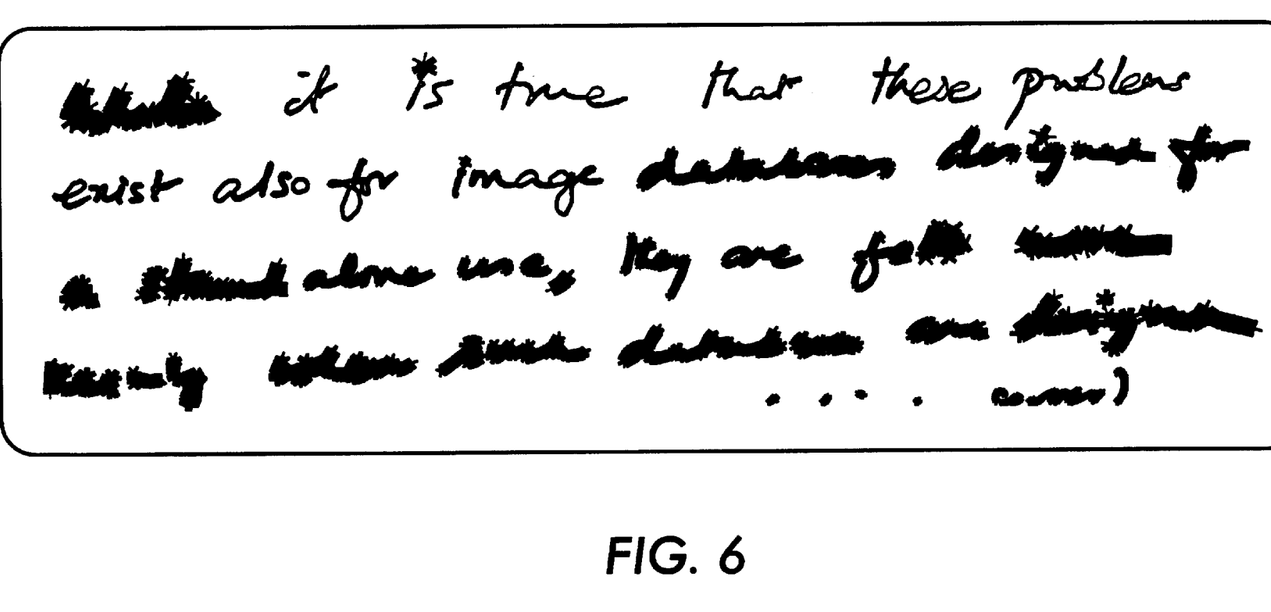
FIG. 6 illustrates lines of text groupings to peaks as determined by a selective Hough transform.
Figure 7:
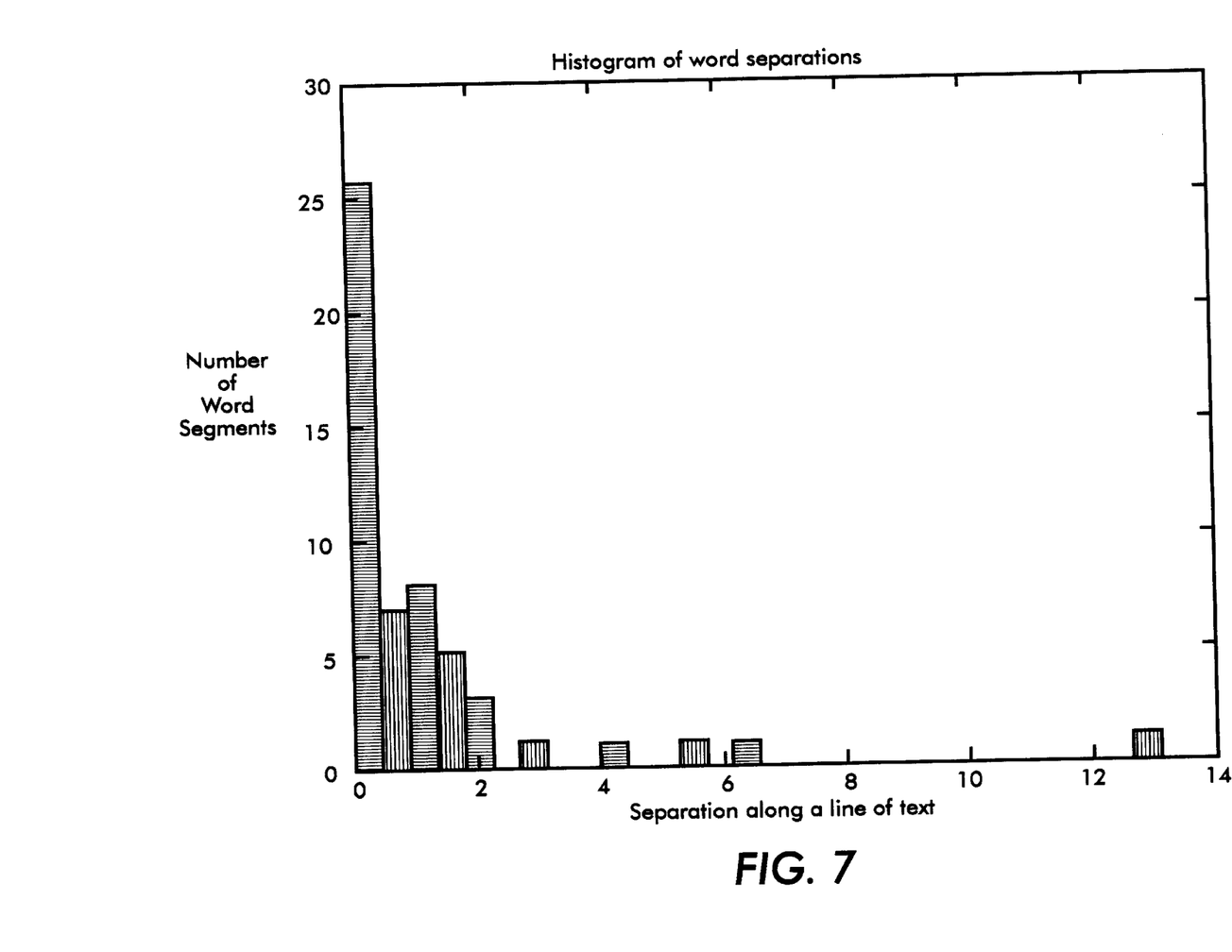
FIG. 7 illustrates a peak of at least 2 separations from the histogram.
Figure 8:
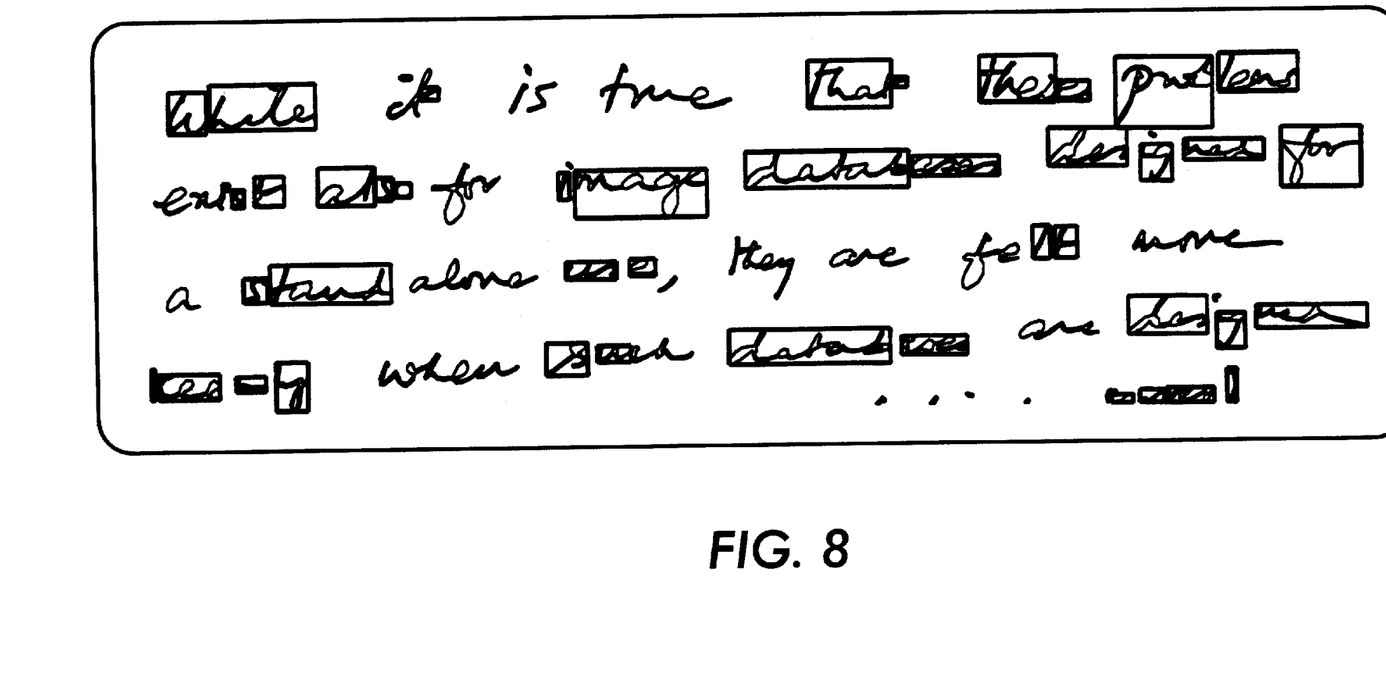
FIG. 8 illustrates the separations corresponding to the peak at the lowest separation value used as an estimate of intra-word separation in the algorithm.

FIG. 2A shows a scanned handwritten document in which the word database appears segmented differently into text segments in the instances in which it occurs. FIG. 4 shows the orientation histogram of the text regions, clearly showing a peak at nearly horizontal text line orientation. By taking a selective Hough transform along the selected peak orientation, and grouping text regions on lines corresponding to peaks in the Hough transform as described above and shown in FIG. 5, the lines of text determined by the Hough transform are shown in FIG. 6. Here the text segments belonging to a line are rendered in identical line thickness. Next, FIGS. 7 and 8 illustrate the text segment grouping for forming handwritten words in a document. The histogram of separations of FIG. 7 show a peak at least two separations. The separation corresponding to the peak at the lowest separation value is used as an estimate of intra-word separation in the algorithm as shown in FIG. 8.

Use of Grouped Text Segments in Word Localization

This section describes the use of the handwritten word for purposes of query localization as also reported in the co-pending patent application identified in the background. From the curves of the text regions grouped as words, corner features are derived as those points where significant curvature deviation occurs. That is, where the angle between two incident lines is greater than a specified threshold. Note that since the images are assumed to be scanned at high resolution, the lines are thick enough so that junctions are also manifested as corners in such images. Corner features on a curve are chosen as the basic unit for localization using the rationale that although not all curves come from single words, especially in the presence of occlusions and noise, features generated from within a curve are more likely to point to a single image location than an arbitrary triple of features chosen randomly across the image.

Figure 9:
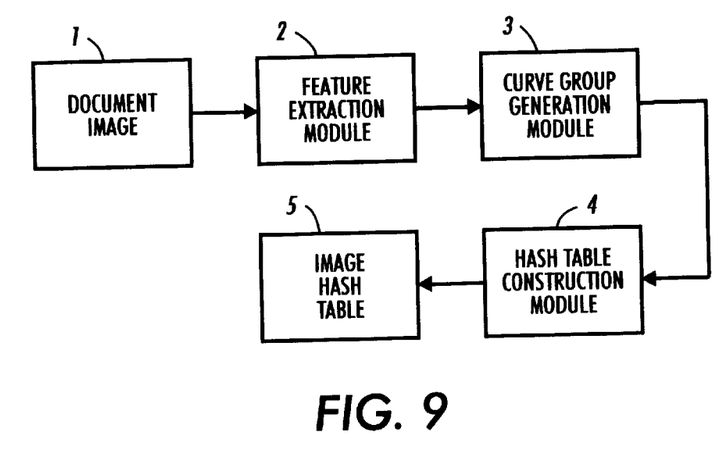
FIG. 9 illustrated a block diagram of system modules implementing the invention for handwritten word recognition and also engaged in handwritten word group generation and indexing.

Using the features derived above, a data structure called an image hash table is developed within the Hash Table Construction Module 4 in FIG. 9 and is used to succinctly represent information in the position of features in curves in curve groups in a manner that helps locate a query handwritten word. To understand the idea of an image hash table, suppose for the sake of simplicity, each curve group consists of a single curve. Suppose the task is to locate a given query curve in an image consisting of this curve among others. Consider three consecutive non-collinear feature points (O, $P_1$, $P_2$) on the given query curve. Then it is well-known that the coordinates of any other point P of the curve can be expressed in terms of the coordinates of points (O, $P_1$, $P_2$) (called basis triples) as:

$$OP = \alpha OP_1 + \beta OP_2$$

The coordinates $(\alpha, \beta)$ are called affine coordinates and they are invariant to affine transformations. Thus, if the given curve appears in the image skewed, or rotated, the corresponding points on the transformed image curve will have the same coordinates with respect to the transformed basis triples in the transformed image curve. Thus, one way to check if a curve at an image location matches a given curve is to see if enough feature points on the image curve have the same affine coordinates with respect to some image basis triple (O', $P'_1$, $P'_2$) on the image curve. In this case, it can also be inferred that the basis triples on the image curve and the given (query) curve correspond. From such a correspondence, the pose information can be derived as an affine transform:

$$(A, T) = \begin{pmatrix} a & b \\ c & d \end{pmatrix} + \begin{pmatrix} T_1 \\ T_2 \end{pmatrix}$$

that is obtained by solving a set of linear equations as:

$$\begin{pmatrix} O_x & O_y & 0 & 0 & 1 & 0 \\ 0 & 0 & O_x & O_y & 0 & 1 \\ P_{1x} & P_{1y} & 0 & 0 & 1 & 0 \\ 0 & 0 & P_{1x} & P_{1y} & 0 & 1 \\ P_{2x} & P_{2y} & 0 & 0 & 1 & 0 \\ 0 & 0 & P_{2x} & P_{2y} & 0 & 1 \end{pmatrix} \begin{pmatrix} a \\ b \\ c \\ d \\ T_1 \\ T_2 \end{pmatrix} = \begin{pmatrix} O'_x \\ O'_y \\ P'_{1x} \\ P'_{1y} \\ P'_{2x} \\ P'_{2y} \end{pmatrix}$$

where $(O_x, O_y) = O$ and x and y refer to the x and y coordinates of the points O, and so on.

Construction of Image Hash Table

Since occlusions, noise, and other changes can cause a triple of basis points on the given curve to not be visible in the corresponding image curve, affine coordinates of all points with respect to more sets of basis triple points may have to be recorded. The resulting Image Hash Table 5 (FIG. 9) is a data structure that is a convenient way to represent this computed information so that the entries are the basis triples that give rise to a range of affine coordinates. The image hash table is constructed within the Hash Table Construction Module 4 using a suitable quantization of the affine coordinates, and recording the basis points that give rise to the respective affine coordinates. That is:

$$H(\alpha 1 <= \alpha < \alpha 2, \beta 1 <= \beta < \beta 2) = \{<O', P'_1, P'_2> \ldots \}$$

so that for any given amine coordinate $(\alpha, \beta)$ of a point, the possible basis points that gave rise to it can be found by looking in the hash table in the entry $\alpha\_\{1\} <= \alpha < \alpha\_\{2\}$, $\beta\_\{1\} <= \beta < \beta\_\{2\}$. Generalizing to the case of more curves in a curve group, the image ash table is constructed as follows. Each triple of consecutive features in a curve is used as a basis triple, and the affine coordinates of all features in the curve group are computed. Thus the basis points are taken from a single curve, but the affine coordinates are computed for all features on all curves in a curve group.

Because consecutive triples of features are used for basis points, only a linear number of basis points need to be recorded unlike $O(N^3)$ in straightforward geometric hashing. Also, the size of the hash table is $O(N^2)$ as against $O(N^4)$ in ordinary geometric hashing. The computational feasibility of this scheme together with its ability to localize objects makes it an improvement over existing variants of geometric hashing.

Indexing or Word Localization

Figure 10:
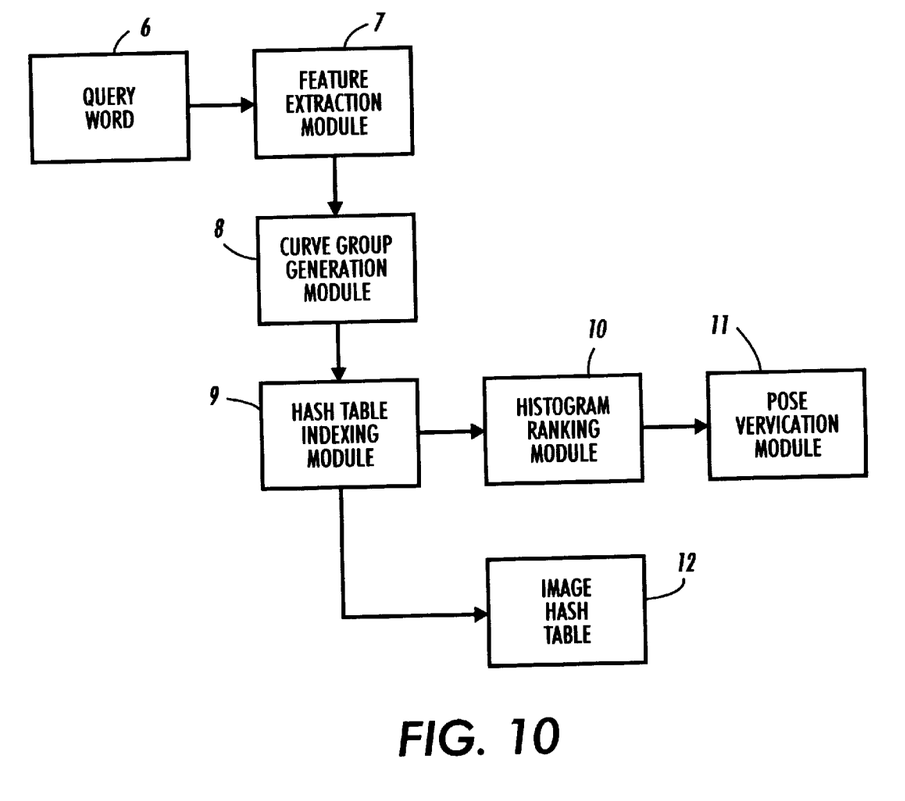
FIG. 10 is a further illustration of a system block diagram of modules engaged in query localization by image indexing of hash tables using the pre-processing performed by the present invention.
Figure 12:
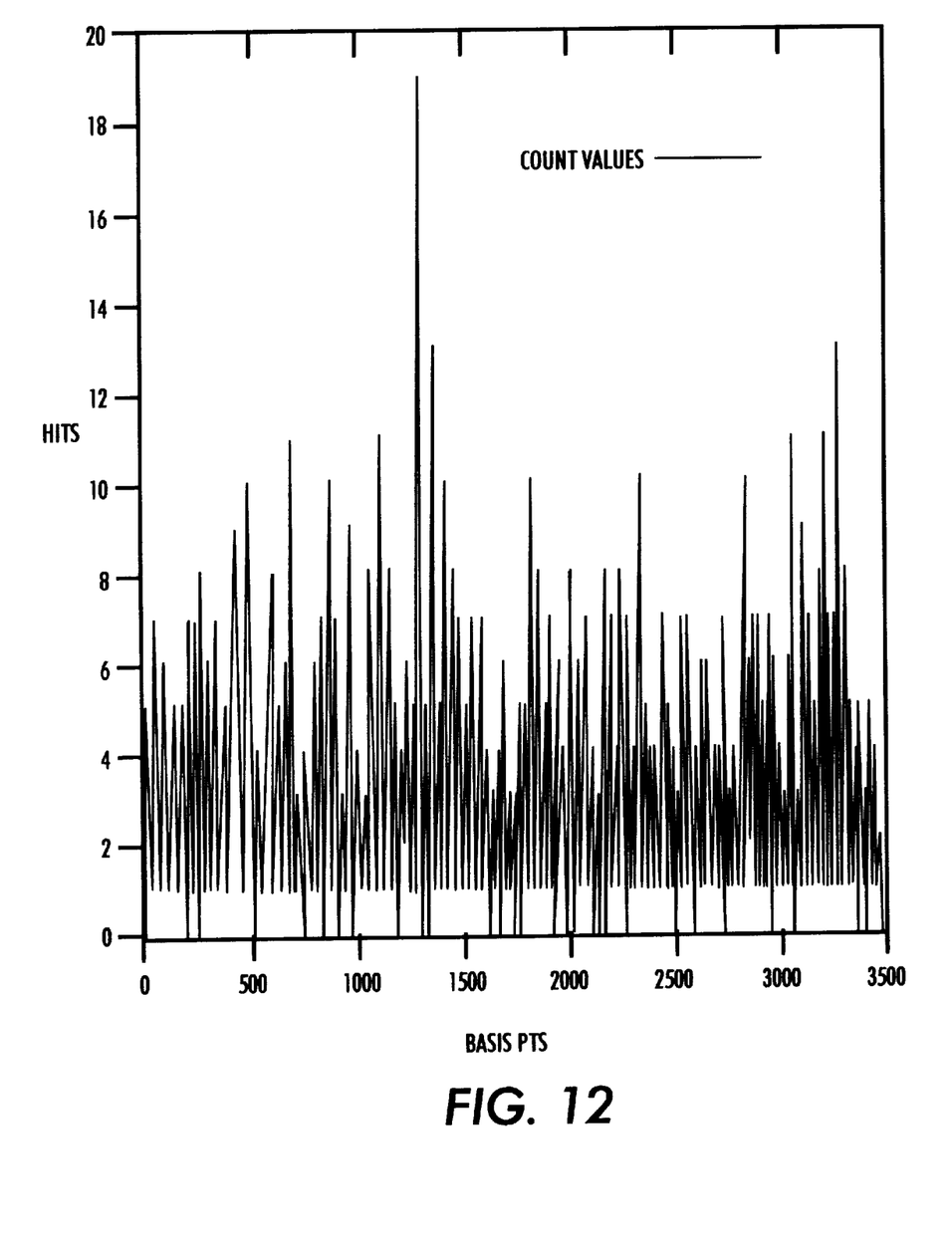
FIG. 12 illustrates a histogram of hashing based coordinates for FIG. 11B.

Refer to the block diagram in FIG. 10. During indexing, a Query Word 6 is given to the system, and curve groups are generated from the word using the pre-processing steps and requisite modules (7 and 8) for feature generation described in FIG. 3. The word localization is attempted first using curve groups of longer average curve lengths. For each such curve group, sets of affine coordinates are computed within the Indexing Module 9 and used to index the Image Hash Table 12. Since the number of basis points are linear, this operation can be repeated with respect to all basis points in the curve group for robustness. For each basis triple that was indexed using the affine coordinates, the number of times it was indexed (called a hit) as well as the corresponding query triple are recorded. A histogram of the number of hits and the corresponding query word and matching basis points in the document image are recorded within the Histogram Ranking Module 10. The peaks in the histogram are then taken as the candidate locations for the query.

The indexing of the hash table accounts for the breaking of words into word segments in the image (or query word) by generating a set of affine coordinates as follows:

1. Let intra-word separation be: $T=(t_1,t_2)$.
2. For each basis triple <O,P1,P2>, and a given feature point P, compute affine coordinates $(\alpha,\beta)$, and $(\alpha'_k,\beta'_k)$ where $$\begin{bmatrix} \alpha'_k \\ \beta'_k \end{bmatrix} = \begin{bmatrix} \alpha \\ \beta \end{bmatrix} + \begin{bmatrix} (p_{1x}-o_x) & (p_{2x}-o_x) \\ (p_{1y}-o_y) & (p_{2y}-o_y) \end{bmatrix}^{-1} \begin{bmatrix} k_{t1} \\ k_{t2} \end{bmatrix}$$

and where k is a number representative of the number of curves in a curve group. The value of k is meant to be tuned to the handwriting style of the author (i.e., the way he/she writes words in their characteristic style).

3. Use each of the affine coordinates to index the hash table and record peaks in the histogram of hits as described before.

Verification

The last step of word localization verifies the word at the candidate locations given in the indexing step. This is conducted by the Pose verification module 11. This step involves recovering the pose parameters (A,T) by solving the set of linear equations for the matching basis points corresponding to the significant hits.

Using the pose parameters, all points (i,j) (includes corner features) on curves of the query word are projected into the document image at location (i',j') where $$\begin{pmatrix} i' \\ j' \end{pmatrix} = \begin{pmatrix} a & b \\ c & d \end{pmatrix} \begin{pmatrix} i \\ j \end{pmatrix} + \begin{pmatrix} T_1 \\ T_2 \end{pmatrix}.$$

It is then verified if a point feature on each curve in the image lies within some neighborhood of the projected point. The ratio of matched projected points to the total number of points on all curves in the query word constitutes a verification score. The verification is said to succeed if this score is above a suitably chosen threshold. If no matching basis points are verified, then the next most significant query curve group is tried until no more significant groups are left. In practice, however, the correct query localization is achieved early in the indexing operation using the strongest query curve.

Example

Figure 11A:
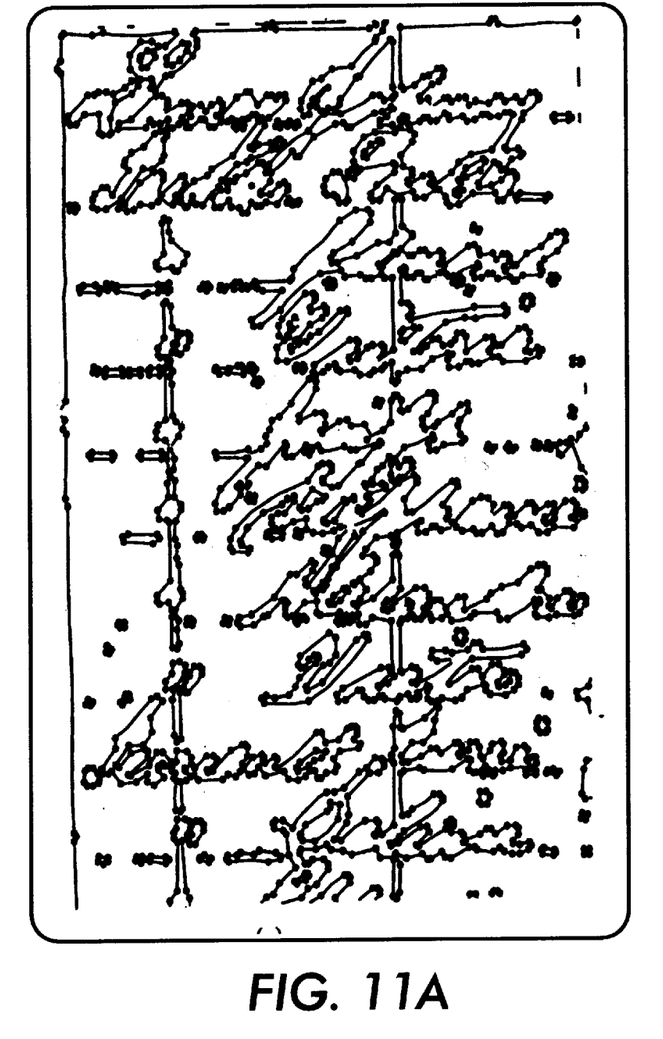
FIG. 11A illustrates the results of preprocessing and feature extraction of the image of FIG. 1.
Figure 11B:
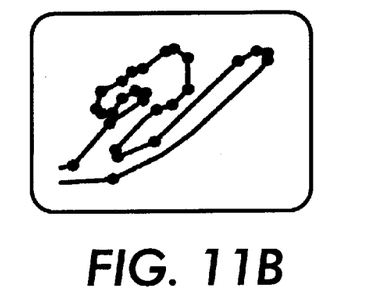
FIG. 11B illustrates a query pattern consisting of a single curve extracted image of FIG. 11A.
Figure 13:
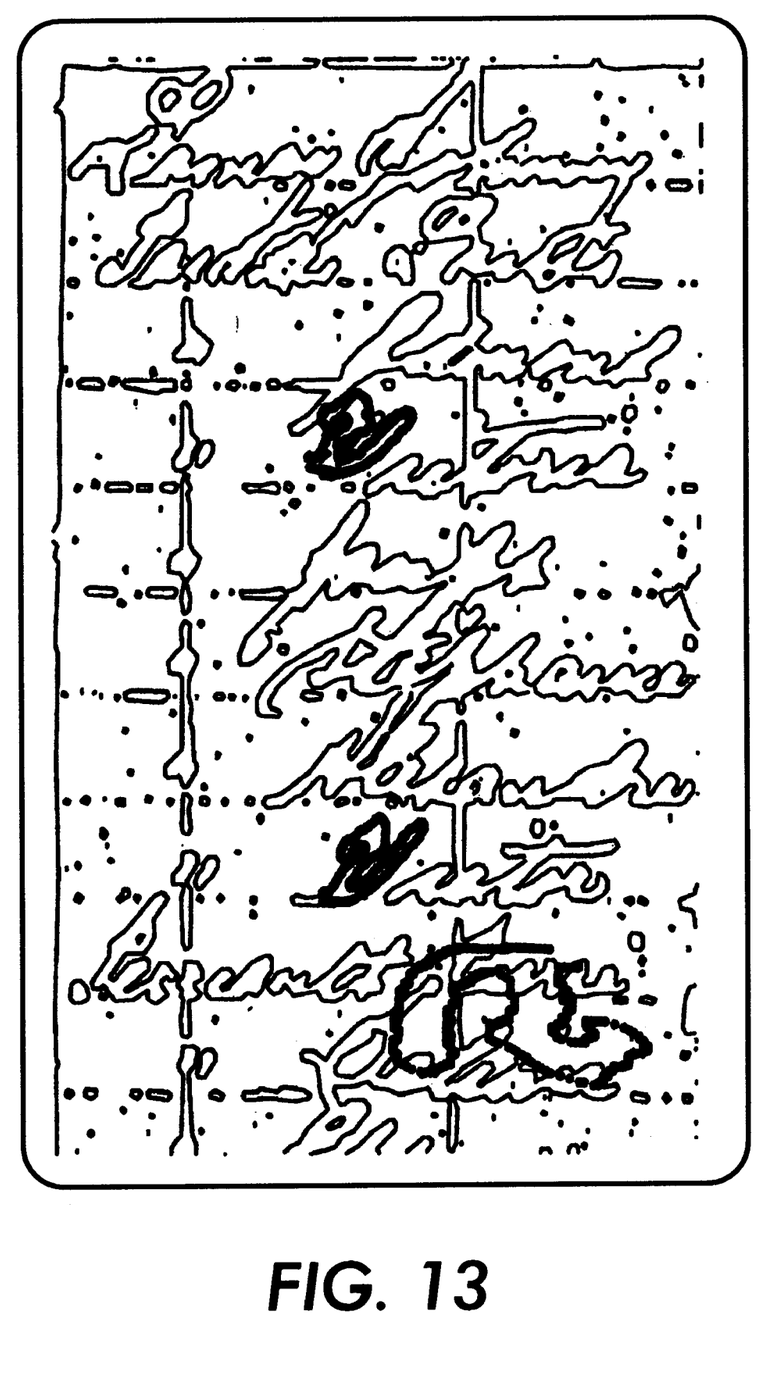
FIG. 13 illustrates Hashing results for the histogram of FIG. 12.

FIG. 1 shows a scanned handwritten document and FIG. 11A shows the result of pre-processing and feature extraction on that image. The corner features per curve used for hash table construction are shown as circles in FIG. 11A. There are 179 curves and 2084 corners in all the curves combined. These give rise to 3494 basis points for the hash table. FIG. 11B shows a query pattern consisting of a single curve. FIG. 12 shows the histogram of hashing based on affine coordinates. Here the image basis points are plotted against the number of hits they obtained from affine coordinates on the query pattern. FIG. 13 shows the results of hashing. The hashed image basis points corresponding to the three most significant peaks of the histogram are matched to their respective query basis triples to compute candidate poses. The query curve is then projected into the image using the pose parameters and shown overlayed on the original image in FIG. 13. As can be seen, the top two matches localize the query pattern correctly at the two places it occurs. The third match is however, a false positive which can be removed during pose verification. The false positive occurs in this case because of a merging of the foreground text patterns with the lines of the tabular background in the image.

Referring back to FIGS. 2A–2C, illustration of query localization by hashing is shown, this time using curve groups. FIG. 2A shows a sample document in which a word "database" occurs twice. The query word "database" is illustrated in FIG. 2B. The inter-letter spacing between letters of the word is not uniform in the two instances. The query pattern used for indexing is shown in FIG. 2C. Once again the top three matches are shown overlayed (after pose solution) on the original image to indicate query localization. Notice that using the indexing scheme, the word has been localized even when its constituent letters are written with different spacings in the two instances in which it occurs in the image. The false positive match shown here persisted even after pose verification, because of the similarity with the underlying word based on corner features.

Extension to Handwriting Tokenization

By choosing the query handwritten word to be one of the curve groups in the image itself, the above method can be used to identify multiple occurrences of the word in the document without explicitly matching to every single word in the document as is done by other tokenization schemes (e.g. DigiPaper™ by Xerox Corporation). Also, by using affine invariant features within curve groups, such a tokenization scheme is robust to changes in orientation, skew, and handwriting variances for a single author.

Generalizing to Locating Arbitrary 2d Objects in Scene Images

By processing natural images to generate curves (perhaps by edge detection and curve tracing), the above method can be generalized to handle arbitrary 2d object shapes in unsegmented natural scene images. The grouping constraint to generate the curve groups may not be as easy to define in such cases as it was for handwritten documents (words are written more or less on a line). Finally, the above method admits other feature units besides corner features on curves. The grouping property, however, must be preserved with any feature unit used for localizing the object.

The foregoing description of the invention has been presented for purposes of illustration and to describe the best mode known for implementing of the invention. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and any examples be considered as exemplary only, with the true scope and spirit of the invention being indicated in the following claims.

What is claimed is:

1. A method of grouping scanned handwritten word text line segments to generate handwritten words for the recognition and indexing of documents, said method comprising the steps of:

generating at least one connected component region of said handwritten word text segments wherein centroid and dominant orientation are identified, said centroid being the first order moments of said region, and said dominant orientation being determined by the direction of the moment of inertia axis of a region;

selecting peaks in a histogram of said dominant orientation which represent major word orientations in said handwritten word;

conducting distance computation of said connected component regions through along-line inter-region determination;

determining curve and corner features from said connected regions by a plurality of boundary points on connected component regions; and developing intra-word text segment groupings.

2. The method of claim 1 wherein text lines are identified by a selective Hough transform wherein a two-dimensional array records the number of points that lie close to a line of specified orientation and position whereby highest valued entries in said table correspond to candidate lines of text, and wherein regions whose centroids contribute to said peak table entries are stored.

3. The method of claim 2 further comprising the step of estimating an intra-word separation from said handwritten text using the projecting of boundaries of the word segment regions lying on said lines of text.

4. The method of claim 3 wherein determined boundary points on connected component regions are as points that have at least one "off" neighbor and wherein said curves are smoothed using a conventional line-segment approximation algorithm.

5. The method of claim 4 wherein, using the intra-word separation and said curves belonging to text regions, curve groups are further assembled by grouping selected text segment regions that are separated along said line of text orientation by a distance within a certain bound of the determined intra-word separation above.

6. A method of recognizing handwritten words in scanned documents, comprising the steps of:

processing a document containing handwritten words wherein features for word localization are extracted in terms of orientation, skew and intra-word separation from handwritten words contained in said document through basis points taken from a single curve of text lines, and wherein affine coordinates are computed for all features on all curves in a curve group;

storing said features in a memory;

accessing said features from memory for comparison to handwritten words in a scanned document to recognize words within said scanned document; and grouping text segments of handwritten words for purposes of indexing said documents.

7. The method of claim 6 wherein said detection of lines of handwritten text takes into account the changes in appearance of the word under 2D affine transforms, changes in the orientation of the lines of text, overall document skew, changes in word appearance due to occlusions, noise, or intra-word handwriting variations made by a single author.

8. A system for recognizing handwritten words by preprocessing a scanned document containing handwriting where features for word localization are extracted from handwritten words contained in said document, said system comprising:

i) a feature extraction module which forms connecting component regions of a scanned document image representing said handwritten words of said document;

ii) a curve group generation module assembles groups of curves separated by intra-word separation curve segments belonging to said handwritten words within said scanned document image wherein text lines are independent of page orientation; and iii) a memory wherein said handwritten words are indexed based on features for word localization extracted from said handwritten words contained in said document and wherein text segments are grouped from said handwritten words for purposes of indexing said documents based on words queries.

9. The invention of claim 8 further comprising a microprocessor programmed to perform activities of said feature extraction module and said curve group generation module.

10. The invention of claim 8 further comprising a memory wherein said handwritten words are indexed based on features for word localization extracted from said handwritten words contained in said document and wherein text segments are grouped from said handwritten words for purposes of indexing said documents based on words queries.

11. The invention of claim 10 further comprising a scanner for scanning document containing handwritten words.

12. The invention of claim 9 further comprising a memory wherein said handwritten words are indexed based on features for word localization extracted from said handwritten words contained in said document and wherein text segments are grouped from said handwritten words for purposes of indexing said documents based on words queries.

13. The invention of claim 9 further comprising a scanner for scanning document containing handwritten words.

14. A system for the recognition of handwritten words wherein features of handwritten word regions are extracted from said handwritten words for subsequent feature generation, extraction and recognition applications, comprising a microprocessor programmed to:

generate at least one connected region for each text line of said handwritten words wherein centroid and dominant orientation are identified, said centroid being the first order moments of said region, and said dominant orientation being determined by the direction of the moment of inertia axis of a region;

select peaks in a histogram of said dominant orientation which represent major word orientations in said handwritten word;

conduct distance computations of said connected regions through along-line inter-region determination;

determine curve and corner features from said connected regions by a plurality of boundary points on connected component regions;

develop intra-word text segment groupings; wherein said intra-word text segment groupings are the groupings of text segments into handwritten words that requires the knowledge of intra-word separations between text segments that lie along a line of text, text line detection is independent of page orientation and does not assume that the individual lines of handwritten text are parallel, and all word regions are not required to be aligned with the text line orientation;

indexing said handwritten words based on features for word localization extracted from said handwritten words contained in said document; and grouping text segments from said handwritten words for purposes of indexing said documents based on words queries.

* * * * *